(12) United States Patent
Gunselmann et al.

(10) Patent No.: US 10,361,645 B2
(45) Date of Patent: Jul. 23, 2019

(54) METHOD FOR IDENTIFYING AN ERROR STATE IN A BRUSHLESS DIRECT CURRENT MOTOR

(71) Applicant: Continental Automotive GmbH, Hannover (DE)

(72) Inventors: Christian Gunselmann, Liederbach (DE); Frank Sader, Königstein (DE)

(73) Assignee: Continental Automotive GmbH, Hannover (DE)

( * ) Notice: Subject to any disclaimer, the term of this patent is extended or adjusted under 35 U.S.C. 154(b) by 10 days.

(21) Appl. No.: 15/748,241

(22) PCT Filed: Sep. 24, 2015

(86) PCT No.: PCT/EP2015/071937
§ 371 (c)(1),
(2) Date: Jan. 29, 2018

(87) PCT Pub. No.: WO2016/046299
PCT Pub. Date: Mar. 31, 2016

(65) Prior Publication Data
US 2019/0052200 A1    Feb. 14, 2019

(30) Foreign Application Priority Data

Sep. 24, 2014  (DE) .................. 10 2014 219 331

(51) Int. Cl.
*B62D 5/04*        (2006.01)
*H02P 6/08*        (2016.01)
(Continued)

(52) U.S. Cl.
CPC .............. *H02P 6/16* (2013.01); *B62D 5/0487* (2013.01); *H02P 6/08* (2013.01); *H02P 29/032* (2016.02); *H02P 2203/05* (2013.01)

(58) Field of Classification Search
CPC ...... H02P 1/00; H02P 1/04; H02P 6/00; H02P 6/14; H02P 21/00; H02P 6/16;
(Continued)

(56) References Cited

U.S. PATENT DOCUMENTS 5,005,089 A * 4/1991 Thanos ................ G11B 5/5556
                                                  360/77.03
5,084,791 A * 1/1992 Thanos ................ G11B 5/5556
                                                  360/77.03
(Continued)

FOREIGN PATENT DOCUMENTS

CN       102009688 A    4/2011
DE       10041606 A1    3/2002
(Continued)

OTHER PUBLICATIONS

German Search Report for German Application No. 10 2014 219 331.1, dated Mar. 17, 2015, including partial English translation, 9 pages.
(Continued)

*Primary Examiner* — Antony M Paul
(74) *Attorney, Agent, or Firm* — RatnerPrestia

(57) ABSTRACT

A method for identifying an error state in a brushless direct current motor. For the purposes of this identification, an angle deviation between a shaft angle and a control angle is calculated and used to identify error states on the basis of characteristic patterns. This also works, in particular, for slowly-rotating or stationary brushless direct current motors and allows a clear reduction in the calculation capacities required, compared to the prior art.

16 Claims, 8 Drawing Sheets

(51) Int. Cl.
*H02P 6/16* (2016.01)
*H02P 29/032* (2016.01)

(58) Field of Classification Search
CPC .......... H02P 23/00; H02P 27/00; G05B 11/01; G05B 19/10; H02K 29/12; H02K 29/08; H02K 29/10
USPC ............ 318/400.4, 602, 618, 628, 661, 685, 318/400.01, 400.12, 400.14, 400.33, 318/400.37, 400.38, 400.39, 700, 701, 318/721, 727, 779, 799, 800, 801, 430
See application file for complete search history.

(56) References Cited

U.S. PATENT DOCUMENTS

| | | | |
|---|---|---|---|
| 6,603,279 | B2 | 8/2003 | Moddemann |
| 6,750,626 | B2 | 6/2004 | Leonardi et al. |
| 8,766,586 | B2 | 7/2014 | Sonoda et al. |
| 9,182,214 | B2 | 11/2015 | Kaufmann et al. |
| 2010/0264862 | A1 | 10/2010 | Kitagawa |
| 2011/0062904 | A1 | 3/2011 | Egami |
| 2011/0062984 | A1 | 3/2011 | Kuwahara et al. |
| 2015/0263654 | A1 | 9/2015 | Toens et al. |

FOREIGN PATENT DOCUMENTS

| | | |
|---|---|---|
| DE | 10338211 A1 | 4/2004 |
| DE | 102010063692 A1 | 2/2012 |
| DE | 102013008191 A1 | 11/2013 |
| DE | 102012213709 A1 | 2/2014 |

OTHER PUBLICATIONS

International Search Report for International Application No. PCT/EP2015/071937, dated Dec. 8, 2015, 2 pages.
International Preliminary Report on Patentability and Written Opinion for International Application No. PCT/EP2015/071937, dated Mar. 28, 2017, 10 pages.
Chinese Office Action for Chinese Application No. 201580051342.9, dated Jul. 24, 2018, with translation, 16 pages.

* cited by examiner

METHOD FOR IDENTIFYING AN ERROR STATE IN A BRUSHLESS DIRECT CURRENT MOTOR

CROSS REFERENCE TO RELATED APPLICATIONS

This application is the U.S. National Phase Application of PCT International Application No. PCT/EP2015/071937, filed Sep. 24, 2015, which claims priority to German Patent Application No. 10 2014 219 331.1, filed Sep. 24, 2014, the contents of such applications being incorporated by reference herein.

FIELD OF THE INVENTION

The invention relates to a method for identifying an error state in a brushless direct current motor having a shaft.

BACKGROUND OF THE INVENTION

Brushless direct current motors, also referred to as BLDC motors, are used in numerous applications nowadays. By way of example, they are used in motor vehicles to support the steering. This constitutes for example a particularly safety-critical function in which, therefore, measures are typically implemented in order to identify possible error states of the brushless direct current motor in a timely manner and to avoid an uncontrolled reaction of the vehicle. In accordance with the prior art, this is carried out for example with the aid of a current measurement in one or a plurality of phases of the brushless direct current motor, or with the aid of a voltage measurement. In particular, it is thus possible to determine a respective current direction of phase currents of the brushless direct current motor and in particular the zero crossings thereof with high accuracy.

Specific disadvantages occur, however, in the case of the variants for determining error states that are known from the prior art. A current measurement is associated in particular with high costs for a measuring circuit necessary for that purpose and yields only a low signal quality in particular at low current intensity. The voltage measurement enables only little meaningfulness regarding the level of the current intensity, requires algorithms that are intensive in respect of computational time and memory space, does not allow monitoring with the motor at a standstill and has a long error identification time at low rotational speed since a plurality of complete electrical revolutions are required in this case.

SUMMARY OF THE INVENTION

Therefore, an aspect of the invention is a method for identifying an error state in a brushless direct current motor which is altered in comparison with the known embodiments, wherein it at least partly overcomes in particular the disadvantages of the prior art.

An aspect of the invention relates to a method for identifying an error state in a brushless direct current motor having a shaft. The method comprises the following steps:

recording a shaft angle assigned to the shaft, recording a drive angle which indicates a respectively assigned angle value for each of a number of measured sectors of a drive circuit of the direct current motor, calculating an angle difference by subtracting the drive angle from the shaft angle, calculating an angle deviation from the angle difference using a reference value, applying a number of predefined specifications to the angle deviation as a function of the shaft angle or time, wherein an error state is assigned to each specification, and ascertaining an error state if a specification to which the error state is assigned indicates the error state upon the application.

An aspect of the invention is based on the insight, in particular, that calculating the angle deviation as just described enables error states of a brushless direct current motor to be identified particularly simply, wherein said angle deviation is not known from the prior art. This involves a function or distribution preferably to be fixed in a suitable way, for example in a manner as described further below. This is possible with significantly reduced requirements in respect of computational capacity in comparison with the prior art. Moreover, the method according to the invention also allows an advantageous identification of error states at low rotational speeds or with the motor at a standstill.

The shaft is in particular that component of the brushless direct current motor which is driven in a rotary fashion during the operation of the brushless direct current motor. In this case, the shaft angle is typically dependent on an angle formed by the shaft in relation to a reference angle. By contrast, the drive angle is an angle which results from the driving of the brushless direct current motor by the drive circuit or a driver circuit. This therefore involves an angle which indicates the state in which the phases or windings are currently in or intended to be in on account of corresponding driving. In this case, a sector of the drive circuit corresponds to an angle range of the drive angle in which no change in sign of the phase currents occurs. For this reason, the drive angle is typically present only with a limited resolution, in particular in the form of discrete angle values, the number of which depends on the total number of phases of the brushless direct current motor. In this case, the drive circuit is typically that circuit which supplies the brushless direct current motor with electrical energy in a defined manner, for example by progressively energizing respective phases, for example in each case two phases of the brushless direct current motor, in a defined direction. The reference value is in particular that value which indicates the smallest possible resolution of the drive angle. It is typically dependent on the number of phases of the brushless direct current motor. If the brushless direct current motor has three phases, then the reference value is preferably 60°, for example. Generally, in many cases the reference value can be determined by dividing 180° by the number of phases. It is typically predefined for the implementation of the method, for example by corresponding programming of an electronic device in which the method is implemented. In one embodiment, the reference value may also be 0°, for example if the angle deviation is equal to the angle difference, that is to say that the angle difference is accepted unchanged as the angle deviation.

Preferably, calculating the angle deviation from the angle difference is carried out as follows:

if the angle difference is negative:

Angle deviation=angle difference, if the angle difference is not negative but is less than or equal to the reference value:

Angle deviation=0°, if the angle difference is greater than the reference value:

Angle deviation=angle difference−reference value.

An angle difference calculated in this way is a value which indicates how far away mathematically the shaft angle is from the drive angle. The angle deviation is calculated (from the angle difference in such a way that it takes account of the fact that the drive angle is present only with a limited resolution in the form of a plurality of discrete angle values. Typically, the angle deviation is constant at 0° if no error state of the brushless direct current motor is present. It should be understood that this can be used for example to ascertain positively the fact that the brushless direct current motor is free of errors.

In accordance with one embodiment, a specification is an algorithm. This may mean, in particular, that specific predefined computation operations are performed with the angle deviation, and the result thereof is a factor in establishing whether or not the specification indicates the error state. In accordance with an embodiment which is an alternative thereto but is also combinable therewith, a specification comprises a comparison with a predefined pattern. This may comprise a pattern recognition. There are various embodiments for this purpose. By way of example, a pattern of half a motor rotation may be compared with a reference pattern. Patterns of a plurality of successive revolutions may also be stored and compared together with a reference pattern. By way of example, an average value pattern may be formed from the stored patterns, said average value pattern containing respective average values of the angle deviations occurring. Moreover, further system information, in particular information that influences the pattern, may also be concomitantly included in the pattern recognition.

In particular, further system information such as, for example, direction of rotation, torque requirement, rotational speed, link circuit voltage or other parameters of the drive circuit or of the brushless direct current motor may be taken into account when applying a specification. The reliability can thus be increased even further. This can be carried out for example in the context of a pattern recognition to be performed.

Preferably, the process of respectively applying a specification extends at least over a range of the drive angle of one, two, three or more sectors. In principle, the process of applying a respective specification can extend over an arbitrary number of sectors. It is preferred, in particular, for each sector to correspond to a range of the shaft angle of 60° if no error state is present. This enables in particular an advantageous application of the method to a brushless direct current motor having three phases. In the case of a different number of phases, the value can be correspondingly adapted.

In order to identify short circuits, the application of a corresponding specification preferably extends to a range of the drive angle of at least 180°. It should be understood that the identification becomes fundamentally more accurate and more reliable the greater the number of sectors over which the process of applying a specification extends.

If the process of applying a specification extends over more than 360°, then in particular averaging over a plurality of revolutions is possible. It is thus possible to record corresponding parameters one after another and to calculate therefrom values for the angle deviation, wherein respective values of the angle deviation which belong to respectively periodically repeating or periodically corresponding values of an independent variable such as shaft angle or time are used for forming an average value. The average values calculated in this way are then used for applying a specification.

In accordance with one embodiment, the drive angle is determined by means of a voltage measurement at terminals of the direct current motor. Preferably, a difference formation between a measured mark-space ratio and a control mark-space ratio is determined for this purpose. In this case, the control mark-space ratio is that mark-space ratio which is predefined by the drive circuit. The latter is known from the drive circuit. If the measured mark-space ratio deviates from the control mark-space ratio, this indicates a current flow in the corresponding motor phase. In this case, the sign of the deviation (difference) corresponds to the sign of the phase current.

In accordance with a further embodiment, which can be applied separately or else can be combined with the voltage measurement just described, the drive angle is determined by means of a current measurement of phase currents of the brushless direct current motor. This enables a higher accuracy in particular in certain situations.

The angle values of the drive angle are preferably selected from a group consisting of 0°, the reference value and a number of integer multiples of the reference value. The above explanations are applicable with regard to the reference value, in particular regarding the dependence thereof on the number of phases.

In accordance with one preferred embodiment, the group consists of the values 0°, 60°, 120°, 180°, 240° and 300°. In accordance with an embodiment which is an alternative thereto and is likewise preferred, the group consists of the values −180°, −120°, −60°, 0°, 60° and 120°. Such embodiments have proved to be advantageous in particular for three-phase brushless direct current motors.

In accordance with one embodiment, the shaft angle is determined from the output signal of an angle sensor assigned to the shaft, which output signal is corrected by an angle portion of a reactive current. In this case, the angle sensor records in particular the present rotation angle of the shaft relative to a specific reference angle. The described correction by reactive currents, in particular reactive currents of coils or phases of the brushless direct current motor, enables an advantageous compensation of such reactive currents and thus a frequently better performance of the method according to the invention. It should be understood, however, that the shaft angle can also be used without compensation of reactive currents; by way of example, the shaft angle can be determined directly from the output signal of an angle sensor assigned to the shaft.

A description is given below of some specifications which can be implemented in the context of the method. It should be understood that the specifications can be applied both individually and in any desired combination. They can thus in particular also be combined with one another, wherein a plurality of specifications can also be applied one after another for example to calculated values of the angle distance, in order to ascertain different error states. It should furthermore be understood that the specifications are not necessarily implemented such that there are no overlaps between respective ranges within which they indicate an error state. Rather, there may indeed be overlaps between the specifications mentioned, such that two or more error states can be indicated when two or more specifications are applied to the same signal. The basis for this is, in particular, that the error states also overlap in terms of their cause; by way of example, error states may be limit states of other error states, or error states may merge fluidly with one another.

In accordance with one embodiment, the respective specifications used are implemented in such a way that a respective error state is identified only if all of the conditions described or indicated are fulfilled. Depending on the design of an evaluation circuit to be used, the person skilled in the art will find suitable solutions which make it possible to check the stated characteristics for the respective error state. By way of example, transitions from positive or negative values to 0° can be identified by a corresponding difference formation of values of the angle deviation. In particular, two successive values of the angle deviation can be used for this purpose, wherein the succession relates for example to adjacent discrete values of the shaft angle or time as independent variable.

A change in the drive angle should be understood to mean in particular a jump in the drive angle from one discrete value to another discrete value. A transition of the angle deviation in the case of such a change in the drive angle is typically determined between two values of the angle deviation which occur directly before and after such a change and/or simultaneously with such a change in the drive angle.

In accordance with one embodiment, a specification which is assigned to an error state of "short circuit between two motor terminals" indicates this error state, if the angle deviation in the case of three successive changes in the drive angle exhibits the following transitions occurring one after another:
  remaining constant at 0°,
  change from a positive or negative first value to 0°,
  change from 0° to a second value having an opposite sign to the first value.

It should be mentioned that remaining constant at 0° is also understood to mean a transition or such remaining is understood as a transition. In the case of this transition, however, no change in, the angle deviation takes place. In terms of magnitude the first and second values are typically of the same order of magnitude. This may mean, for example, that in terms of magnitude they differ by less than 1%, less than 5%, less than 10%, less than 20% or less than 30%. In such cases, the method can preferably be performed in such a way that a respective error state is indicated only if the maximum magnitude-related, relative or absolute deviation of the two values from one another is less than a predefined value. This is also applicable to other error states described here or other error states. It should be understood that the magnitudes of the first and second values may change, in particular, if operating parameters of the brushless direct current motor such as, for example, current intensity, voltage or torque requirement change between the occurrence of the first and second values. The definition given here for a same order of magnitude of values is also applicable to the embodiments described further below.

In accordance with one embodiment, a specification which is assigned to an error state "angle offset" indicates this error state, if the angle deviation in the case of each change in the drive angle has a change from a value different than 0° to 0°, in particular if said value always has the same sign and/or is constant in terms of magnitude or remains the same in terms of magnitude at least with regard to the order of magnitude. It is thus possible to identify an angle offset which may be caused for example by an error of an angle encoder or angle sensor or by an erroneous calibration value for the drive circuit.

In accordance with one embodiment, a specification which is assigned to an error state "interruption of a phase" indicates this error state, if the angle deviation in the case of a direct change in the drive angle from a negative value to a positive value or from a positive value to a negative value has a direct transition from a positive or negative first value to a second value having an opposite sign to the first value.

In accordance with one embodiment, a specification which is assigned to an error state "increased resistance in a phase" indicates this error state, if the angle deviation in the case of three successive changes in the drive angle exhibits the following transitions occurring one after another:
  change from 0° to a positive or negative first value,
  change from a second value having an opposite sign to the first value to 0°,
  remaining constant at 0°.

In terms of magnitude, the first value and the second value in this case are typically of the same order of magnitude. It should be mentioned that in the case of this error state typically all phases are shifted since the sum of all phase currents typically, i.e. in particular with corresponding interconnection, yields zero.

In accordance with one embodiment, a specification which is assigned to an error state of "short circuit between two turns at the respective phase center" indicates this error state, if the angle deviation in the case of three successive changes in the drive angle exhibits the following transitions occurring one after another:
  remaining constant at 0°,
  change from a positive or negative first value to 0°,
  remaining constant at 0°.

In accordance with one embodiment, a specification which is assigned to an error state of "bridging of a phase" indicates this error state, if the angle deviation in the case of three successive changes in the drive angle exhibits the following transitions occurring one after another:
  change from 0° to a positive or negative first value,
  change from a second value having an opposite sign to the first value to 0°,
  remaining constant at 0°.

In terms of magnitude, the first value and the second value here are typically of the same order of magnitude. In certain embodiments, the method can be implemented such that the error state of "bridging of a phase" is identified only if the second value is smaller than the first value in terms of magnitude, which may occur in some implementations. It should be mentioned that, in the case of this error state, a bridged phase typically no longer has inductance.

It should be understood that respective values, in particular first and second values, which occur in the case of respective error states occur in some embodiments in each case within typical value ranges which are characteristic of the respective error state. The comparison with correspondingly stored value ranges enables an error state to be better determined or made more plausible. Such value ranges can be determined by the person skilled in the art in the individual case by measurement or simulation. They can advantageously be used in the performance of the method according to the invention. By way of example, it is possible to compare a respective comparison of a value of the angle deviation, for example at a transition directly before or after a jump to 0°, with respective value ranges. The respective error state is then preferably identified only if the value lies within the respective value range. A value range may be defined in particular by an upper limit value and a lower limit value. The evaluation may also be carried out with consideration of respective absolute magnitudes, in particular of the angle deviation.

A pattern of the angle deviation that is characteristic of an error state is typically repeated twice per complete shaft revolution. This can be used for the identification in the context of the method.

In accordance with one preferred embodiment, a transition is used as such in the context of the application of a specification only if an integral over the angle deviation as a function of the shaft angle or as a function of time from a point with a predefined angular or temporal distance before or after the transition to the transition has at least one predefined value in terms of magnitude. This makes it possible to ensure that an identified transition is based not just on a random fluctuation, but actually on an error state. If the angle deviation is considered as a function of the shaft angle, this preferably involves an angular distance. If the angle deviation is considered as a function of time, this preferably involves a temporal distance. By way of example, the angle deviation before a transition or after a transition may have a positive or negative ramp, i.e. for example a ramp having positive or negative values. It has been found that such ramps are characteristic of many error states. The calculation of integrals and comparison with predefined values as just described make it possible to ensure that such a ramp is actually present, without the ramp having to be analyzed in specific detail. However, it should be pointed out that the ramps can in principle also be used separately for identifying error states, for example in the context of a pattern recognition embodied differently.

In accordance with one embodiment, the method furthermore comprises a step of detecting phases which are affected by the error state, specifically by determining which types of transitions occur for which shaft angles and/or drive angles. This makes it possible to determine, for example, for which phase or which phases the corresponding error state occurs. By way of example, the sequences of transitions described further above can be assigned to respective values of shaft angles and/or drive angles, which allows a determination of the affected phase or of the affected phases.

In accordance with one preferred embodiment of the method, an error state is identified in the case of a stationary motor, i.e. in the case of a stationary brushless direct current motor by detecting an angle deviation which in terms of magnitude exceeds a predefined threshold value for at least one predefined time period. This makes it possible to identify an error state even in the case of a stationary motor. This embodiment is based on the insight, in particular, that a deviation of the value of the angle deviation from 0° is generally associated with an error state. In other words, if such a deviation from 0° occurs in the case of a stationary motor, then this indicates an error state with high probability. Typically, however, it is not possible to identify the type of error state in the case of a stationary motor. Consequently, in accordance with a further preferred embodiment, provision may be made for directly deactivating the use of the motor in the case of an error state identified when the motor is stationary; by way of example, a steering assistance in which the brushless direct current motor is used can be deactivated. This can prevent uncontrolled behavior of the steering assistance.

It should be understood that, for example, further errors such as an incorrect motor commutation associated with a shift of the zero crossings of the phase currents or any other type of error, particularly if it is associated with a shift of the zero crossings of the phase currents, can also be identified on the basis of characteristic patterns.

An aspect of the invention furthermore also relates to an electronic control device which is configured for implementing the method according to the invention. Furthermore, the invention also relates to a nonvolatile computer-readable memory medium containing program code, upon the execution of which by a processor a method according to the invention is performed. With regard to the method according to the invention, it is possible here to have recourse to all of the embodiments and variants described.

BRIEF DESCRIPTION OF THE DRAWINGS

The person skilled in the art will infer further features and advantages from the exemplary embodiments described below with reference to the accompanying drawing, in which.

DETAILED DESCRIPTION OF THE PREFERRED EMBODIMENTS

Figure 1:
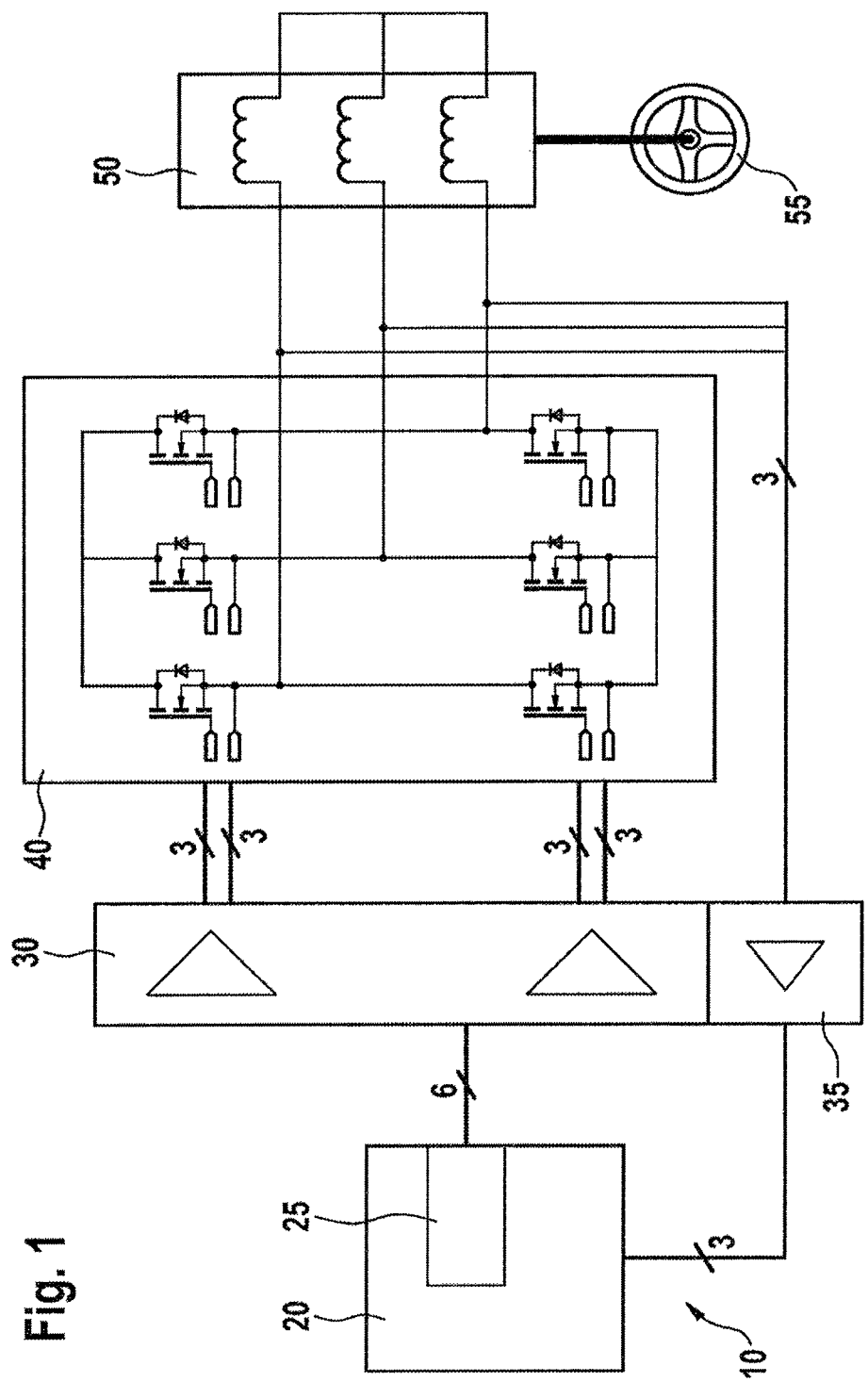
FIG. 1: shows exemplary schematic circuitry of a brushless direct current motor.

FIG. 1 shows a brushless direct current motor 50 with a drive circuit 10. It should be understood that the drive circuit 10 here is also designed for identifying error states. The brushless direct current motor 50 is of three-phase design in the present case. It serves to support steering (not illustrated in further detail) of a vehicle, which steering can be actuated by means of a steering handle in the form of a steering wheel 55. It should be understood, however, that the invention is also applicable to autonomously driving vehicles which for example have no steering handle and/or in which the brushless direct current motor 50 independently steers the vehicle.

The drive circuit 10 has a microcontroller 20, in which processor means and memory means (not illustrated in further detail) are implemented, wherein the memory means contain program code, upon the execution of which by the processor means the microcontroller 20 behaves in a defined manner. The microcontroller 20 has in particular a pulse width modulation module 25 designed for outputting pulse-width-modulated signals.

The drive circuit 10 furthermore has a driver circuit in the form of a gate drive unit (GDU) 30. Moreover, the drive circuit 10 has a power chip module (PCM) 40.

Electrical connections between the individual components are illustrated in part such that there is a number beside the respective connection. This number indicates how many phases are transmitted in the respective connection.

In the present case, the pulse width modulation module 25 is connected to the gate drive unit 30, and the latter is in turn connected to the power chip module 40. Overall suitable drive signals are thus generated for the brushless direct current motor 50. The brushless direct current motor 50 is connected to respective output phases of the power chip module 40 and is thus driven in a known manner. In particular, typically in a respective cycle the three phases of the brushless direct current motor 50 can be driven in such a way that six different magnetic fields are generated successively. Said magnetic fields typically have directions which rotate over the course of time in the clockwise direction or in the counterclockwise direction by 60° in each case. Thus, a shaft (not illustrated) of the brushless direct current motor 50 is correspondingly set in rotation. The three outputs of the power chip module 40, which are connected to the brushless direct current motor 50, are furthermore connected to a phase voltage feedback circuit 35. Via the phase voltage feedback circuit 35, which is in turn connected to the microcontroller 20, the microcontroller 20 receives information about the voltages present at the three inputs of the brushless direct current motor 50.

The microcontroller 20 drives the pulse width modulation module 25 with a known control mark-space ratio defined on the basis of desired operating parameters such as angular velocity or torque of the brushless direct current motor 50. From the fed-back signals from the inputs of the brushless direct current motor 50, the microcontroller 20 likewise calculates respective mark-space ratios and compares the latter with the control mark-space ratios. A drive angle is calculated from the respective deviations, which drive angle at least in error-free operation indicates the present position of the magnetic field in the brushless direct current motor 50. Said drive angle can assume in each case one of the values −180°, −120°, −60°, 0°, 60° and 120°. In a manner governed by the system, the accuracy for the measurement of intermediate values of the stated drive angles is lower. Only the stated drive angles are required for the present method.

The shaft (not illustrated) of the brushless direct current motor 50 is monitored with regard to its rotation angle by means of an angle sensor (likewise not illustrated). The angle sensor supplies corresponding signals to the microcontroller 20. The microcontroller 20 corrects the signal received from the angle sensor by respective reactive currents of the brushless direct current motor 50, which said microcontroller determines on the basis of a method known from the prior art. The microcontroller 20 calculates therefrom a shaft angle that is indicative of a respective rotation position of the shaft.

It should be understood that these calculations are carried out continuously repeatedly.

After the calculation of a respective shaft angle and of a drive angle, the microcontroller 20 subtracts the drive angle from the shaft angle and thus obtains an angle difference. The microcontroller 20 subsequently calculates an angle deviation on the basis of the following specification:

if the angle difference is negative:

Angle deviation=angle difference, if the angle difference is not negative but is less than or equal to 60°:

Angle deviation=0°, if the angle difference is greater than 60°:

Angle deviation=angle difference−60°.

From the profile of the angle deviation as a function of time, the microcontroller 20 can identify error states of the brushless direct current motor 50. For this purpose, said microcontroller carries out a respective pattern recognition with the calculated angle deviation. In particular, in this case it is possible to identify the error states described below with reference to the further figures or else error-free operation of the brushless direct current motor 50.

Figure 2:
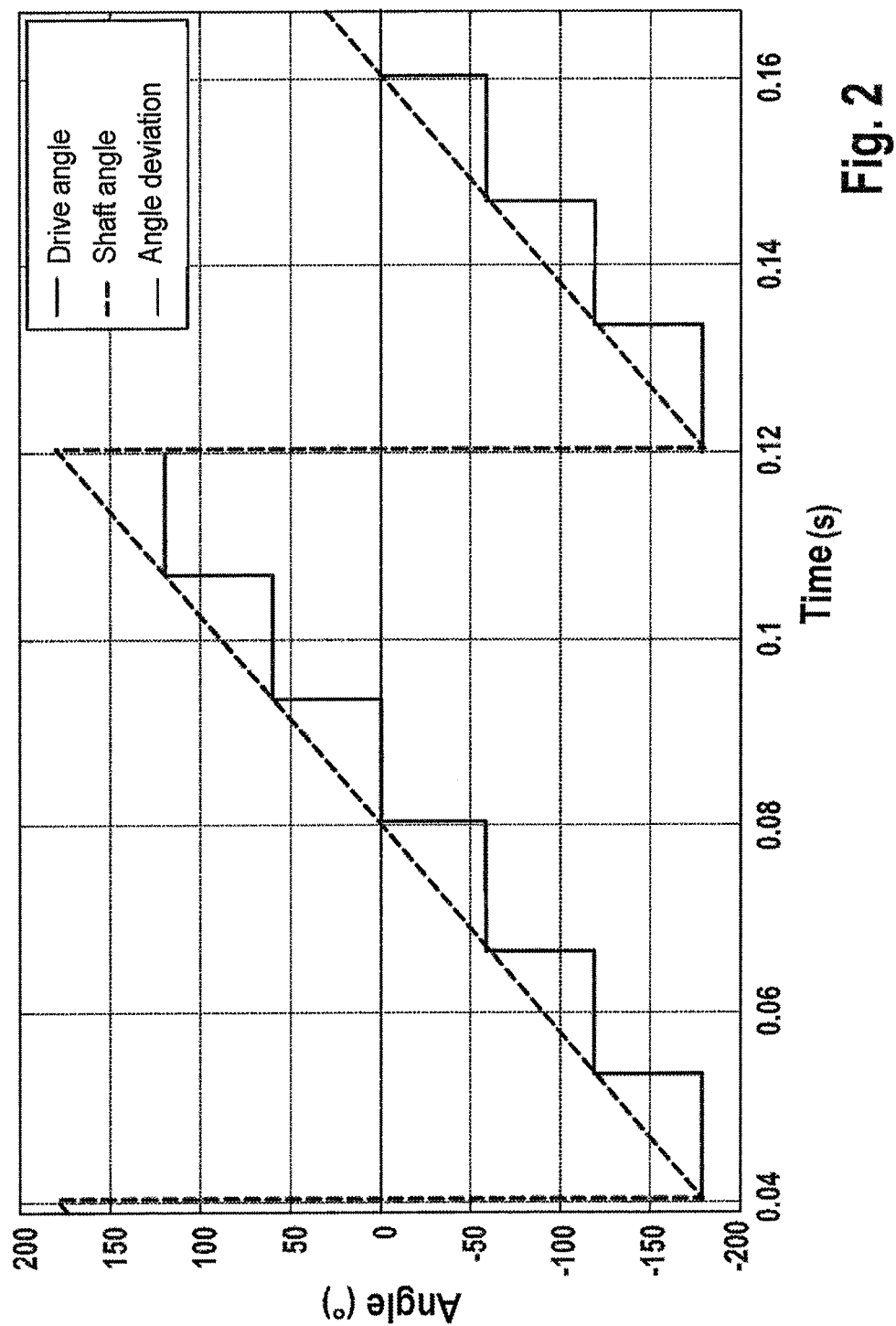
FIG. 2: shows simulations of shaft angle, drive angle and angle deviation in the error-free case.

FIG. 2 shows exemplary simulations of drive angle, shaft angle and angle deviation in an error-free case. FIGS. 3 to 8 show exemplary simulations of drive angle, shaft angle and angle deviation in the case of different error states. The simulations are given here by way of example in order in particular also to be able to explain typical identification modes for the corresponding error states. They relate to a specific case simulated here with specific parameters. It should be understood that other identification modes with which the microcontroller 20 can identify a respective error state or else error-free operation can also be implemented by the person skilled in the art. Such implementations are deemed part of the disclosure of this application.

The respective FIGS. 2 to 8 are set up in such a way that time is plotted on the respective horizontal axis and the angle is plotted on the respective vertical axis. The unit of time is second, and the unit of the angle is degree (°). The drive angle assumes only the discrete values −180°, −120°, −60°, 0°, 60° and 120°. A staircase profile of the drive angle is thus implemented. The shaft angle in principle is rectilinear from −180° to 180° and then jumps again to −180°. The angle deviation usually has a value of 0° and deviates therefrom only at some locations. Typically, respective positive or negative ramps are formed in the case of deviations from 0°. It should be understood that the respective curves for drive angle, shaft angle and angle deviation can be identified unambiguously on the basis of the characteristics described. In part the curves intersect or run over one another over certain sections, such that they are indistinguishable at this location. At least with regard to European patent law it should be mentioned that, in addition to the unambiguous identifiablility via the profile forms just described, the colored differentiations contained in the original documents also form part of the disclosure (see decision T 1544/08).

FIG. 2 shows an error-free state. As can clearly be seen, the angle deviation in this case remains constant at 0°. No deviations whatsoever from this valve take place. If such a state is present, which can be detected by the microcontroller 20 for example by the latter examining the angle deviation for deviations from 0° over a certain period of time or over a certain angle range of the shaft angle of 180° or 360°, for example, then an error-free state can be positively ascertained. It should furthermore be mentioned that respective distances between transitions of the drive angle in the error-free state illustrated in FIG. 2 are identical.

Figure 3:
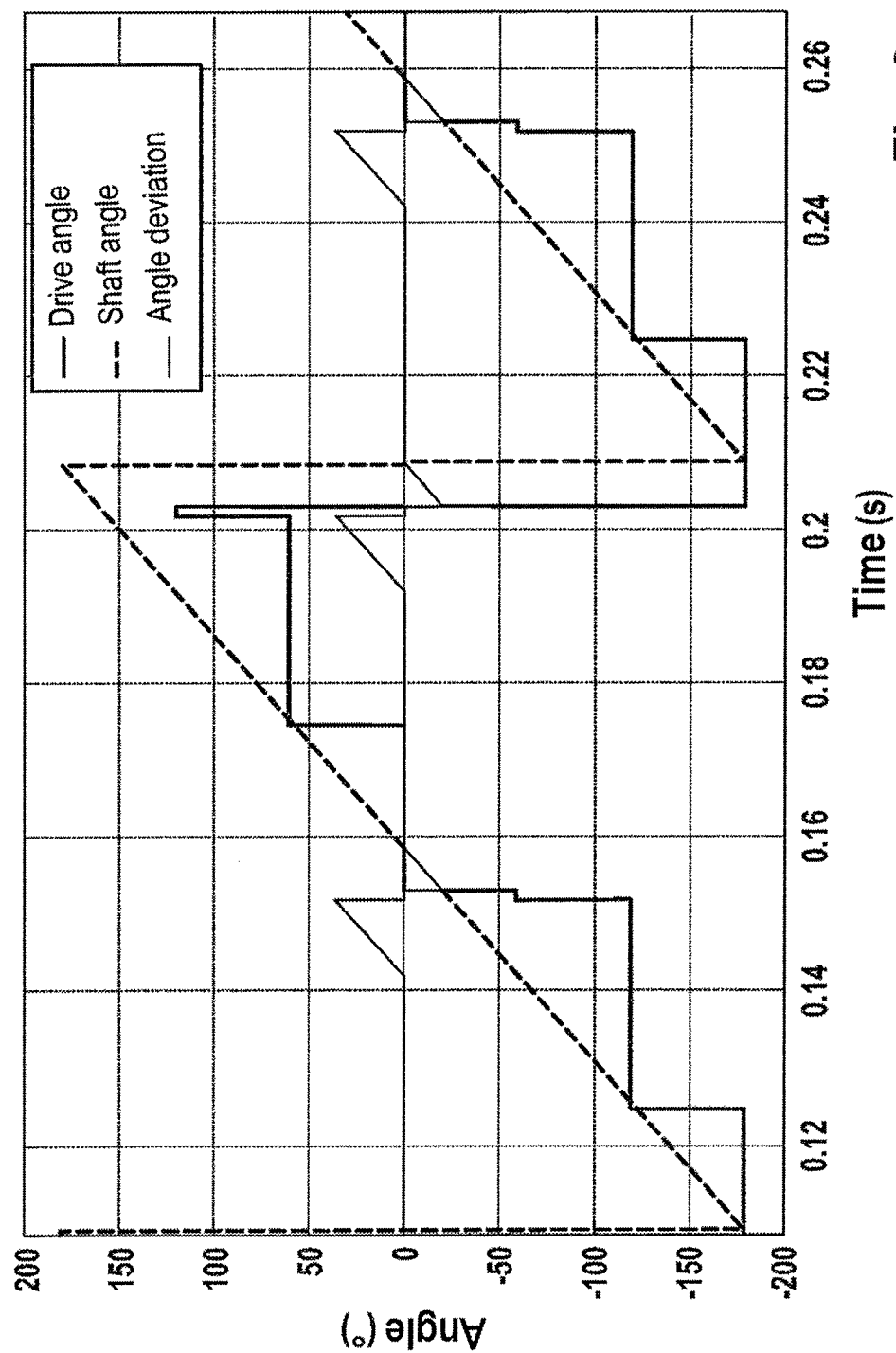
FIGS. 3 to 8: show simulations of shaft angle, drive angle and angle deviation in the case of various error states.

FIG. 3 shows the error state of "short circuit between two motor terminals". As is readily discerned, in this case sectors of the drive angle are shifted in comparison with FIG. 2. This leads to positive and negative edges of the angle deviation. In this case, particularly significant transitions occur in particular in the case of changes in the drive angle. In the case of these, the microcontroller 20 respectively evaluates the angle deviation and identifies the error state represented, if the angle deviation in the case of three successive changes in the drive angle exhibits the following transitions occurring one after another:

remaining constant at 0°,
change from a positive or negative first value to 0°,
change from 0° to a second value having an opposite sign to the first value.

Figure 4:
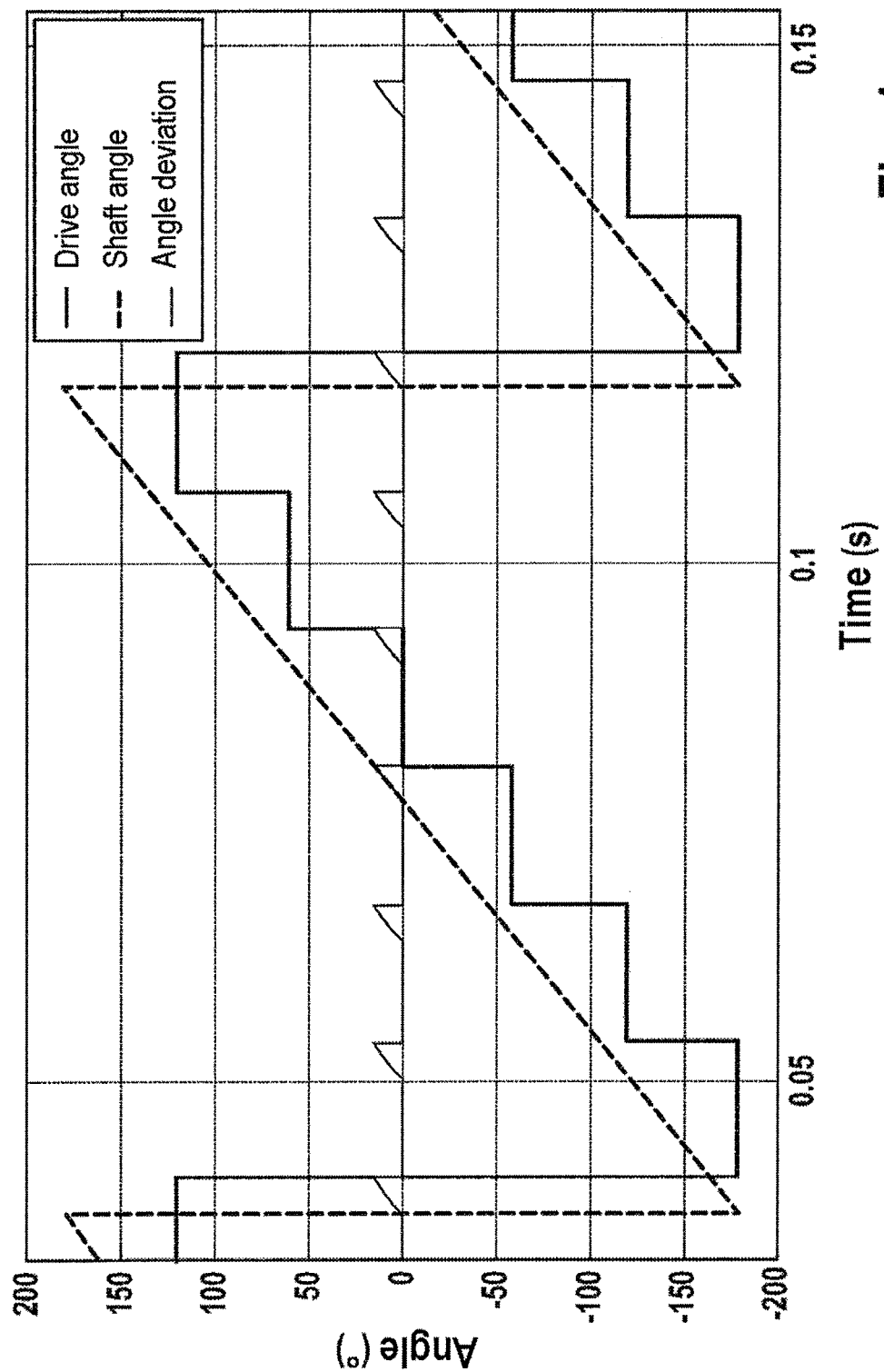

FIG. 4 shows the error state of "angle offset". As is readily discerned, in this case sectors of the drive angle are not shifted in comparison with FIG. 2. However, the curve of the shaft angle is shifted in comparison with FIG. 2. This leads to positive, rising edges of the angle deviation. In this case, particularly significant transitions occur in particular in the case of changes in the drive angle. In the case of these, the microcontroller 20 respectively evaluates the angle deviation and identifies the error state represented, if the angle deviation in the case of each change in the drive angle has a change from a value different than 0° to 0°, particularly if said value always has the same sign and/or is constant in terms of magnitude or remains the same in terms of magnitude at least with regard to the order of magnitude.

Figure 5:
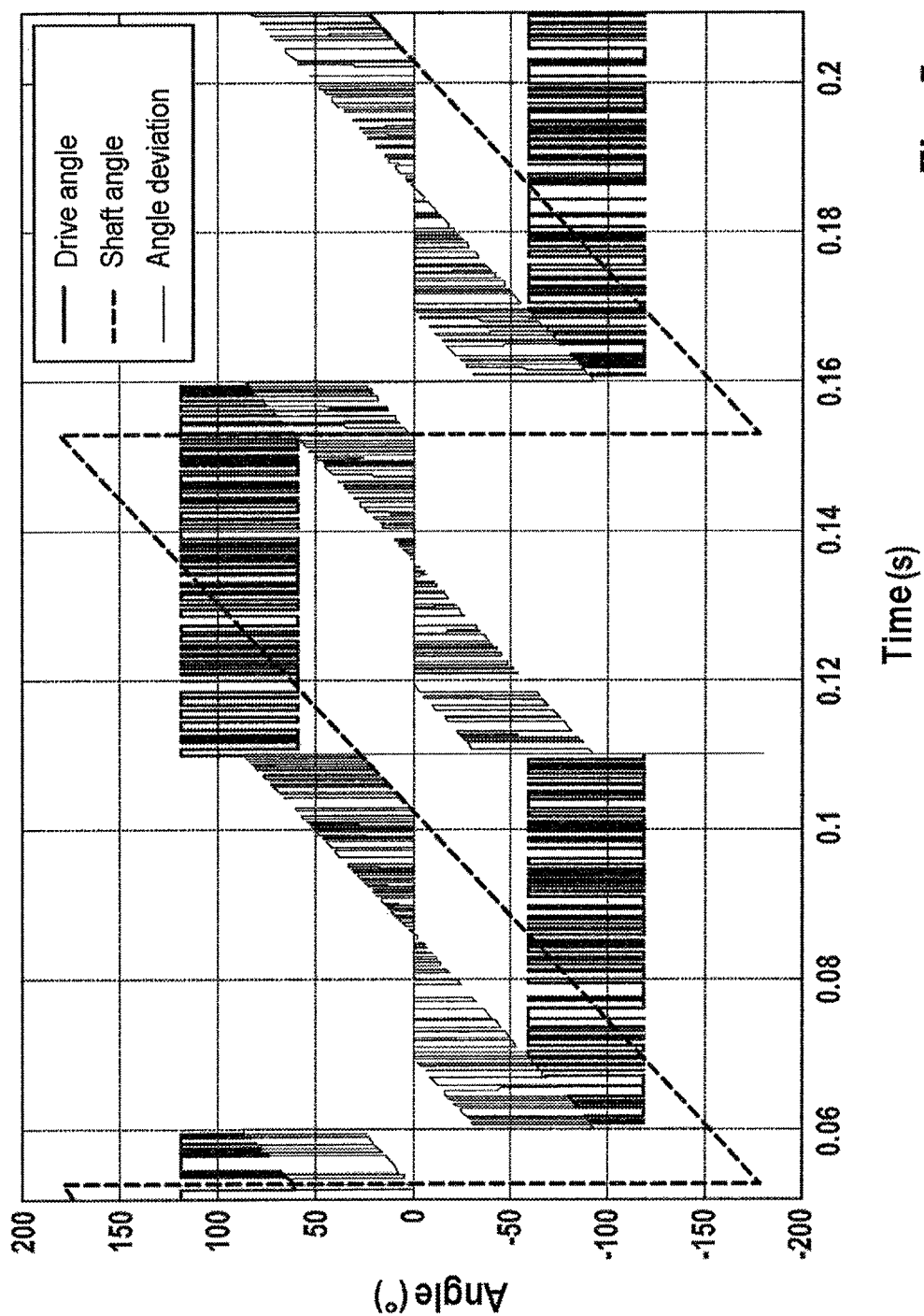

FIG. 5 shows the error state of "interruption of a motor phase". In this case, the drive angle changes only between four values, random changes being possible between respectively two values having the same sign. The reason for this is that in the case of an interruption of a motor phase, a certain noise occurs in the case of this motor phase, said noise leading to such jumps. In this case, the angle deviation assumes positive and negative values to approximately 30°, wherein the associated angle range is designated in particular as "dead angle range". In the rest of the angle range, the angle deviation may change between 0° and values as much as 90°. The error state of "interruption of a phase" is identified by the microcontroller 20 if the angle deviation in the case of a direct change in the drive angle from a negative value to a positive value or from a positive value to a negative value has a direct transition from a positive or negative first value to a second value having an opposite sign to the first value. This corresponds for example to the transition illustrated between the times 0.1 s and 0.12 s in FIG. 5.

Figure 6:
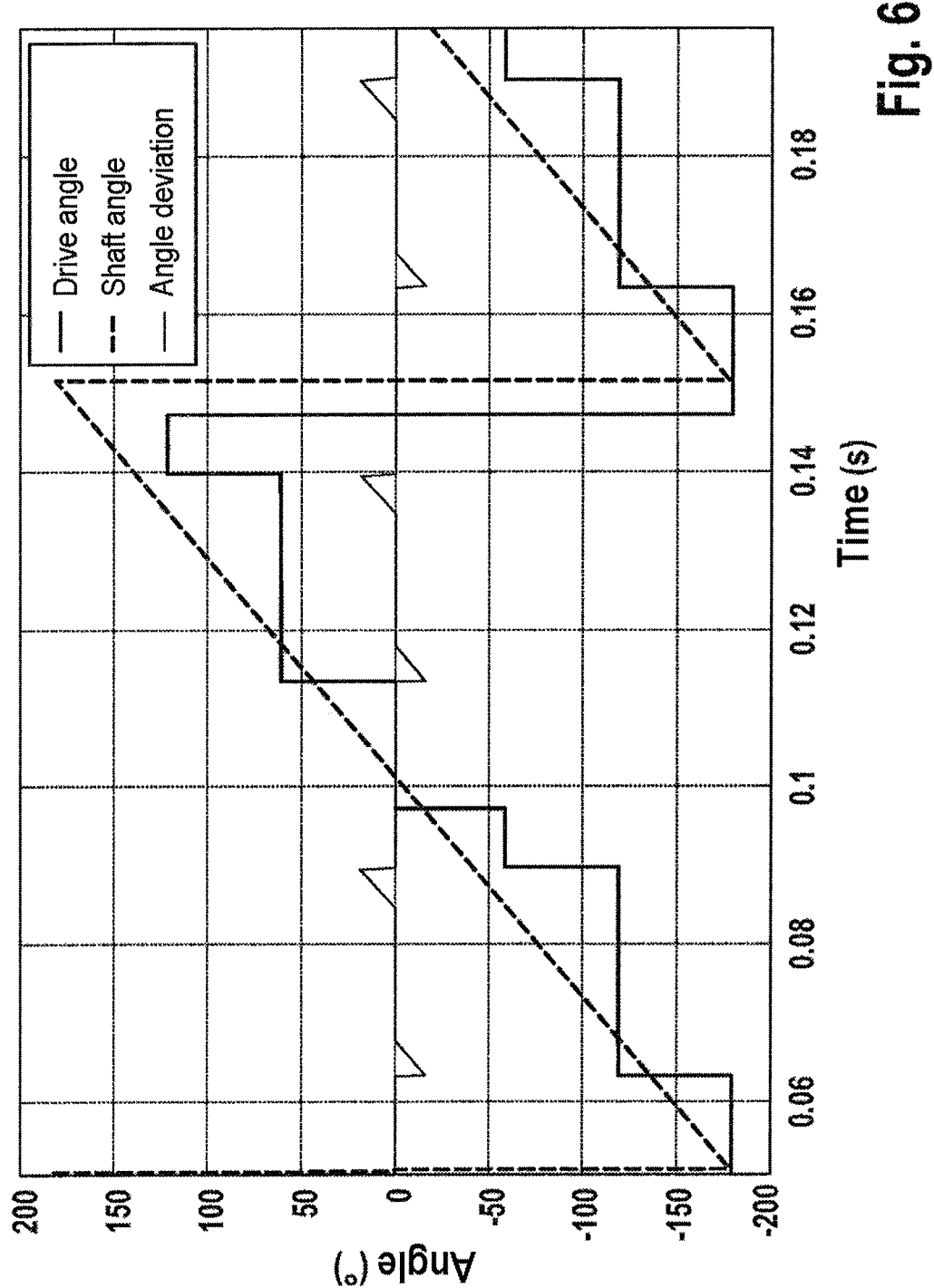

FIG. 6 shows the error state of "increased resistance in a phase". As is readily discerned, in this case sectors of the drive angle are shifted in comparison with FIG. 2. This leads to positive and negative edges of the angle deviation. In this case, particularly significant transitions occur in particular in the case of changes in the drive angle. In the case of these, the microcontroller 20 respectively evaluates the angle deviation and identifies the error state represented, if the angle deviation in the case of three successive changes in the drive angle exhibits the following transitions occurring one after another:

change from 0° to a positive or negative first value,
change from a second value having an opposite sign to the first value to 0°,
remaining constant at 0°.

Figure 7:
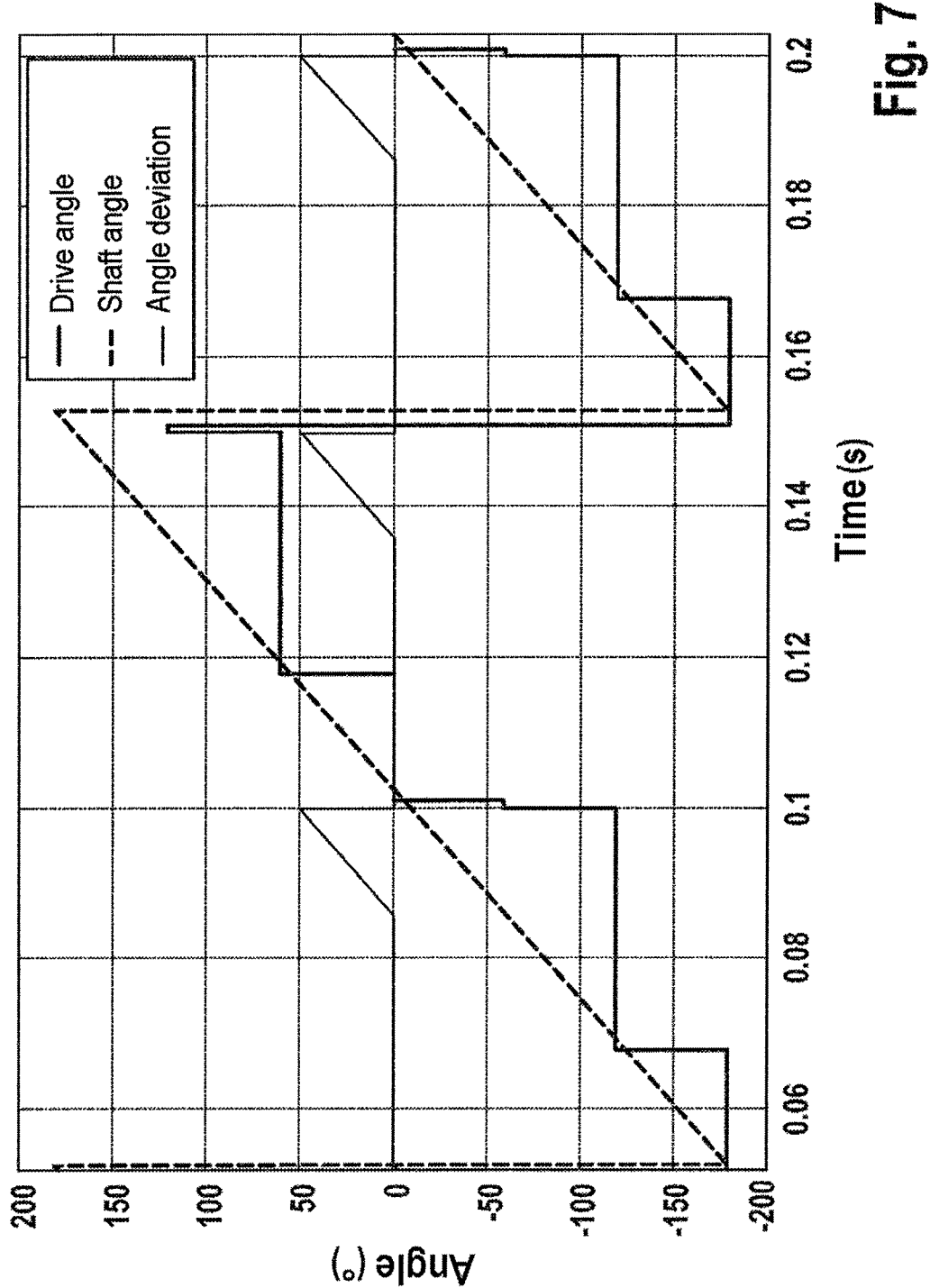

FIG. 7 shows the error state of "short circuit between two turns at the respective phase center". As is readily discerned, in this case sectors of the drive angle are shifted in comparison with FIG. 2. This leads to positive and negative edges of the angle deviation. In this case, particularly significant transitions occur in particular in the case of changes in the drive angle. In the case of these, the microcontroller 20 respectively evaluates the angle deviation and identifies the error state represented, if the angle deviation in the case of three successive changes in the drive angle exhibits the following transitions occurring one after another:

remaining constant at 0°,
change from a positive or negative first value to 0°,
remaining constant at 0°.

Figure 8:
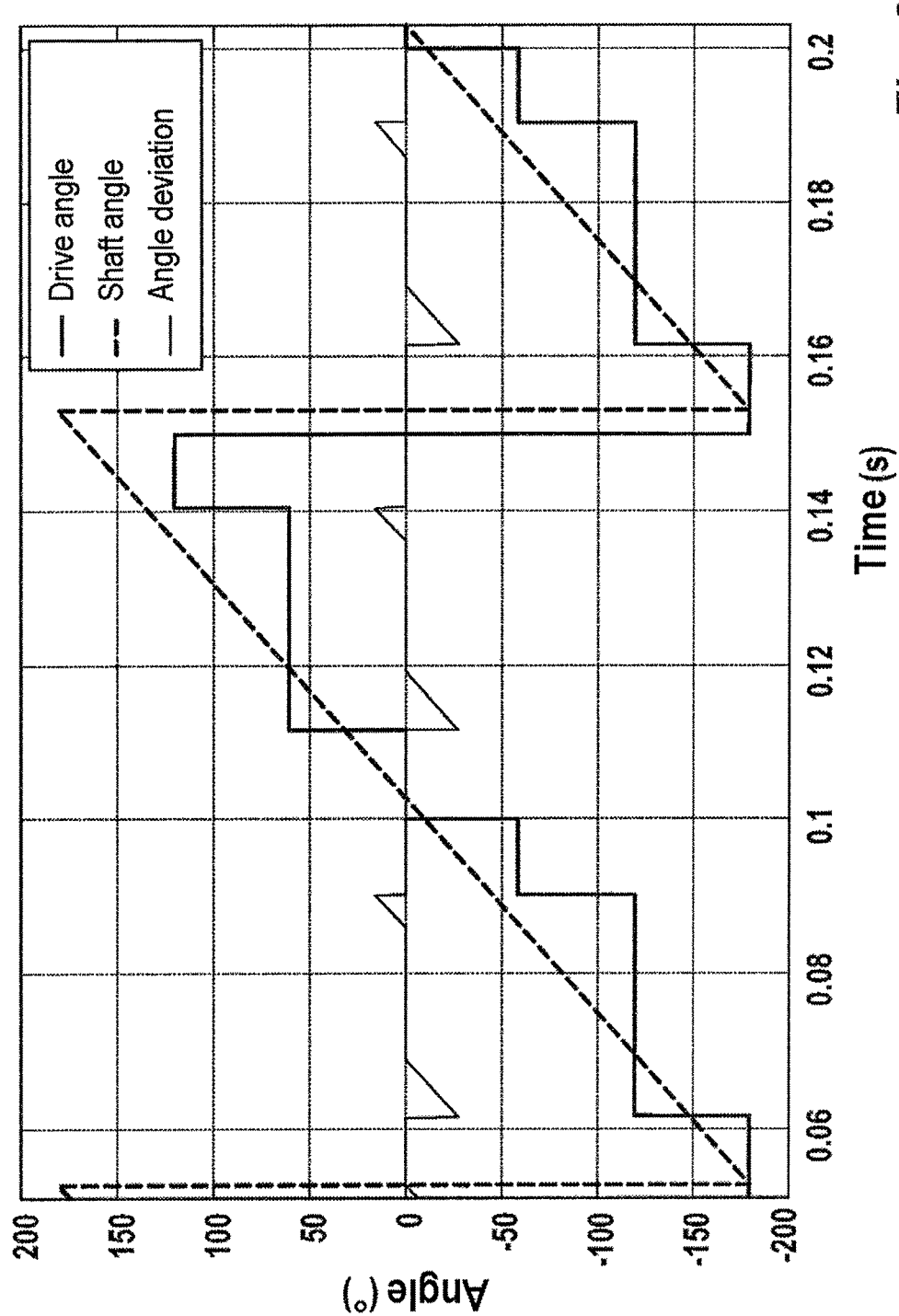

FIG. 8 shows the error state of "bridging of a phase". As is readily discerned, in this case sectors of the drive angle are shifted in comparison with FIG. 2. This leads to positive and negative edges of the angle deviation. In this case, particularly significant transitions occur in particular in the case of changes in the drive angle. In the case of these, the microcontroller 20 respectively evaluates the angle deviation and identifies the error state represented, if the angle deviation in the case of three successive changes in the drive angle exhibits the following transitions occurring one after another:

change from 0° to a positive or negative first value,
change from a second value having an opposite sign to the first value to 0°,
remaining constant at 0°.

In order to increase the reliability of the identification, before the identification of a transition of the angle deviation the microcontroller 20 calculates an integral of the angle deviation as a function of time both from a point at a predefined temporal distance before the transition and from a point at a predefined temporal distance after the transition to the identified transition. It is only if this integral exceeds a predefined value in terms of magnitude that the transition is used as such in the context of identifying an error state. This avoids the identification of error states on account of random fluctuations which are not based on error states.

It should be understood that accurate evaluation of the position of the respective transitions which are illustrated in FIGS. 3 to 8 also enables a conclusion to be drawn about the respectively affected phase or the affected phases of the brushless direct current motor 50. For this purpose, the microcontroller 20 evaluates the transitions in respect of at what shaft angle or at what transition of the drive angle they occur. Not only the error state but also the exact phase can thus be identified. In the case of specific error states which are stored in the microcontroller 20, the further operation of the brushless direct current motor 50 is directly prevented in order to avoid an uncontrolled reaction of the steering.

If the brushless direct current motor 50 is not in operation, that is to say if its shaft is not rotating, in particular, the microcontroller 20 nevertheless continuously monitors the angle deviation. If the angle deviation exceeds a predefined threshold value over a predefined time period, then an error state is identified despite the brushless direct current motor 50 being stationary. Although there is no identification of what error state is involved here, this can further increase safety. In this case, the further operation of the brushless direct current motor 50 is deactivated directly since no information about the error state present is present and further operation would be too risky with regard to a possible uncontrolled reaction of the steering of the vehicle.

It should be understood that the direction of the deviations of the value of the angle deviation from 0°, that is to say whether the angle deviation has a positive or negative value, is predefined by the direction of rotation of the brushless direct current motor 50. If the direction of rotation is reversed, the sign of the respective deviation typically changes as well. In this case, for example, the type of transition may also change, that is to say that, for example, a transition from a positive or negative value to 0° may become a transition from 0° to a positive or negative value, and vice versa. Corresponding variations of the embodiments and characteristics described in this application are deemed part of the disclosure of this application.

The claims associated with the application do not constitute any renunciation of the attainment of further-reaching protection.

If it emerges in the course of the procedure that a feature or a group of features is not absolutely necessary, a wording of at least one independent claim which no longer has the feature or the group of features is sought now at this early stage on the part of the applicant. This may involve for example a subcombination of a claim present on the filing date or a subcombination of a claim present on the filing date that is restricted by further features. Such claims or feature combinations to be worded anew should be understood to be concomitantly covered by the disclosure of this application.

It should furthermore be pointed out that configurations, features and variants of the invention which are described in the various embodiments or exemplary embodiments and/or are shown in the figures are combinable among one another in any desired way. Individual or a plurality of features are mutually interchangeable in any desired manner. Resultant feature combinations should be understood to be concomitantly covered by the disclosure of this application.

Dependency references in dependent claims should not be understood as a renunciation of the attainment of independent, substantive protection for the features of the back-referenced dependent claims. These features may also be combined with other features in any desired manner.

Features which are disclosed only in the description or features which are disclosed in the description or in a claim only in conjunction with other features may fundamentally be of independent importance essential to the invention. They may therefore also be included in claims individually for delimitation from the prior art.

The invention claimed is:

1. A method for identifying an error state in a brushless direct current motor having a shaft, the method comprising:
   recording a shaft angle assigned to the shaft,
   recording a drive angle which indicates a respectively assigned angle value for each of a number of measured sectors of a drive circuit of the direct current motor,
   calculating an angle difference by subtracting the drive angle from the shaft angle,
   calculating an angle deviation from the angle difference using a reference value,
   applying a number of predefined specifications to the angle deviation as a function of the shaft angle or time, wherein an error state is assigned to each specification, and
   ascertaining an error state if a specification to which the error state is assigned indicates the error state upon the application.

2. The method as claimed in claim 1, wherein the angle deviation is calculated from the angle difference as follows:
   if the angle difference is negative:

Angle deviation=angle difference, if the angle difference is not negative but is less than or equal to the reference value:

Angle deviation=0°, if the angle difference is greater than the reference value:

Angle deviation=angle difference −reference value.

3. The method as claimed in claim 2, wherein a specification is an algorithm or a comparison with a predefined pattern.

4. The method as claimed in claim 1, wherein a specification is an algorithm or a comparison with a predefined pattern.

5. The method as claimed in claim 1, wherein the process of respectively applying a specification extends at least over a range of the drive angle of one, two, three or more sectors, wherein each sector corresponds to a range of the shaft angle of 60° if no error state is present.

6. The method as claimed in claim 1, wherein the drive angle is determined by a voltage measurement at terminals of the direct current motor, by a difference formation between a measured mark-space ratio and a control mark-space ratio;
and/or
   wherein the drive angle is determined by a current measurement of phase currents of the brushless direct current motor;
and/or
   wherein the angle values of the drive angle are selected from a group consisting of 0°, the reference value and a number of integer multiples of the reference value, wherein the group consists of the values 0°, 60°, 120°, 180°, 240° and 300° or of the values −180°, −120°, −60°, 0°, 60° and 120°.

7. The method as claimed in claim 1, wherein the shaft angle is determined from the output signal of an angle sensor assigned to the shaft, which output signal is corrected by an angle portion of a reactive current.

8. The method as claimed in claim 1, wherein a specification which is assigned to an error state of short circuit between two motor terminals indicates this error state,
   if the angle deviation in the case of three successive changes in the drive angle exhibits the following transitions occurring one after another:
   remaining constant at 0°,
   change from a positive or negative first value to 0°,
   change from 0° to a second value having an opposite sign to the first value.

9. The method as claimed in claim 1, wherein a specification which is assigned to an error state of angle offset indicates this error state,
   if the angle deviation in the case of each change in the drive angle has a change from a value different than 0° to 0°.

10. The method as claimed in claim 1, wherein a specification which is assigned to an error state of interruption of a phase indicates this error state,
    if the angle deviation in the case of a direct change in the drive angle from a negative value to a positive value or from a positive value to a negative value has a direct transition from a positive or negative first value to a second value having an opposite sign to the first value.

11. The method as claimed in claim 1, wherein a specification which is assigned to an error state of increased resistance in a phase indicates this error state,
    if the angle deviation in the case of three successive changes in the drive angle exhibits the following transitions occurring one after another:
    change from 0° to a positive or negative first value,
    change from a second value having an opposite sign to the first value to 0°,
    remaining constant at 0°.

12. The method as claimed in claim 1, wherein a specification which is assigned to an error state of short circuit between two turns at the respective phase center indicates this error state,
    if the angle deviation in the case of three successive changes in the drive angle exhibits the following transitions occurring one after another:
    remaining constant at 0°,
    change from a positive or negative first value to 0°,
    remaining constant at 0°.

13. The method as claimed in claim 1, wherein a specification which is assigned to an error state of bridging of a phase indicates this error state,
    if the angle deviation in the case of three successive changes in the drive angle exhibits the following transitions occurring one after another:
    change from 0° to a positive or negative first value,
    change from a second value having an opposite sign to the first value to 0°,
    remaining constant at 0°.

14. The method as claimed in claim 1, wherein a transition is used in the context of the application of a specification only if an integral over the angle deviation as a function of the shaft angle or as a function of time from a point with a predefined angular or temporal distance before or after the transition to the transition has at least one predefined value in terms of magnitude.

15. The method as claimed in claim 1, which furthermore comprises detecting phases which are affected by the error state, specifically by determining which types of transitions occur for which shaft angles and/or drive angles.

16. The method as claimed in claim 1, wherein an error state is identified in the case of a stationary brushless direct current motor by detecting an angle deviation which in terms of magnitude exceeds a predefined threshold value for at least one predefined time period.

\* \* \* \* \*